United States Patent
Pontes Bittencourt et al.

(10) Patent No.: US 11,472,700 B2
(45) Date of Patent: Oct. 18, 2022

(54) CATALYST AND PROCESS FOR THERMO-NEUTRAL REFORMING OF PETROLEUM-BASED LIQUID HYDROCARBONS

(71) Applicants: Saudi Arabian Oil Company, Dhahran (SA); PETROBRAS, Rio de Janeiro (BR); King Fahd University of Petroleum & Minerals, Dhahran (SA)

(72) Inventors: Roberto Carlos Pontes Bittencourt, Rio de Janeiro (BR); Mauri Jose Baldini Cardoso, Rio de Janeiro (BR); Vivian Passos de Souza, Rio de Janeiro (BR); Shakeel Ahmed, Dhahran (SA); Aadesh Harale, Dhahran (SA); Sai P. Katikaneni, Dhahran (SA)

(73) Assignees: Saudi Arabian Oil Company, Dhahran (SA); King Fahd University of Petroleum & Minerals, Dbahran (SA); PETROBRAS, Rio de Janeiro (BR)

( * ) Notice: Subject to any disclaimer, the term of this patent is extended or adjusted under 35 U.S.C. 154(b) by 389 days.

(21) Appl. No.: 16/729,229

(22) Filed: Dec. 27, 2019

(65) Prior Publication Data
US 2021/0198106 A1 Jul. 1, 2021

(51) Int. Cl.
*C01B 3/40* (2006.01)
*B01J 23/83* (2006.01)
(Continued)

(52) U.S. Cl.
CPC ............. *C01B 3/40* (2013.01); *B01J 23/83* (2013.01); *B01J 23/8986* (2013.01);
(Continued)

(58) Field of Classification Search
CPC .................................. B01J 23/83; C01B 3/386
See application file for complete search history.

(56) References Cited

U.S. PATENT DOCUMENTS

| | | | |
|---|---|---|---|
| 6,413,016 B1 * | 7/2002 | Nelson | E21B 43/243 405/128.35 |
| 7,700,005 B2 | 4/2010 | Inui et al. | |

(Continued)

OTHER PUBLICATIONS

ISRWO issued in the prosecution of International application PCT/US2020/067053, dated Apr. 13, 2021, 14 pages.

*Primary Examiner* — Paul A Wartalowicz
(74) *Attorney, Agent, or Firm* — Bracewell LLP; Constance G. Rhebergen; Eleanor L. Tyson

(57) ABSTRACT

A process for producing a hydrogen-rich gas stream from a liquid hydrocarbon stream, the process comprising the steps of introducing the liquid hydrocarbon stream to a dual catalytic zone, the liquid hydrocarbon stream comprises liquid hydrocarbons selected from the group consisting of liquid petroleum gas (LPG), light naphtha, heavy naphtha, gasoline, kerosene, diesel, and combinations of the same, the dual catalytic zone comprises: a combustion zone comprising a seven component catalyst, and a steam reforming zone, the steam reforming zone comprising a steam reforming catalyst; introducing steam to the dual catalytic zone, introducing an oxygen-rich gas to the dual catalytic zone; contacting the liquid hydrocarbon stream, steam, and oxygen-rich gas with the seven component catalyst to produce a combustion zone fluid; and contacting the combustion zone fluid with the steam reforming catalyst to produce the hydrogen-rich gas stream, wherein the hydrogen-rich gas stream comprises hydrogen.

10 Claims, 3 Drawing Sheets

(51) Int. Cl.
 *B01J 23/89* (2006.01)
 *C01B 3/38* (2006.01)
(52) U.S. Cl.
 CPC ...... *C01B 3/386* (2013.01); *C01B 2203/0233* (2013.01); *C01B 2203/1058* (2013.01); *C01B 2203/1082* (2013.01); *C01B 2203/1235* (2013.01)

(56) References Cited

U.S. PATENT DOCUMENTS

| | | |
|---|---|---|
| 7,820,140 B2 | 10/2010 | Inui et al. |
| 8,008,226 B2 | 8/2011 | Inui et al. |
| 9,499,403 B2 | 11/2016 | Al-Muhaish et al. |
| 9,637,381 B2 | 5/2017 | Bittencourt et al. |
| 9,714,169 B2 | 7/2017 | Al-Muhaish et al. |
| 2008/0081018 A1 | 4/2008 | Inui et al. |
| 2016/0257564 A1 | 9/2016 | Al-Muhaish et al. |

* cited by examiner

US 11,472,700 B2

CATALYST AND PROCESS FOR THERMO-NEUTRAL REFORMING OF PETROLEUM-BASED LIQUID HYDROCARBONS

TECHNICAL FIELD

Disclosed are compositions and methods related to catalyst formulations. Specifically, disclosed are compositions and methods for catalyst formulations to convert hydrocarbons to hydrogen-rich gas.

BACKGROUND

Energy is a growing global business, with rapid increases expected in transportation fuel consumption and in electricity production. Recent improvements to existing technology have added significant value to marginal resources of competing fuels or through more efficient conversion of oil-based fuel sources (for example, hybrids and diesel engines). Renewed interest in non-oil based hydrogen technologies represents a challenge to oil producers. But also, an opportunity for developing competitive petroleum-based conversion approaches and petroleum-based fuels to take advantage of a possible emerging change in customer and consumer preferences for energy products.

A well-established process in the petroleum industry for the production of hydrogen is the steam reforming process. The steam reforming process uses a nickel-based catalyst, which is highly sensitive to deactivation by sulfur poisoning and coke deposition. However, conventional processes require high amounts of nickel in the catalyst and higher temperatures in the reactors. For example, conventional steam reformers are limited to a gas hourly space velocity of about 5,000 per hour ($hr^{-1}$) requiring large reactors or multiple reactors to effect an industrial scale conversion. The addition of oxygen in the reforming process can initiate auto thermal reform processes, but the nickel-based catalysts remain susceptible to deactivation even with oxygen present.

SUMMARY

Disclosed are compositions and methods related to catalyst formulations. Specifically, disclosed are compositions and methods for catalyst formulations to convert hydrocarbons to hydrogen-rich gas.

In a first aspect, a process for producing a hydrogen-rich gas stream from a vaporized liquid hydrocarbon stream is provided. The process includes the steps of introducing steam to a mixer, wherein the steam is a temperature between 200° C. and 400° C. and atmospheric pressure, introducing an oxygen-rich gas to the mixer, wherein the oxygen-rich gas is selected from the group consisting of air, oxygen, oxygen enriched air, and combinations of the same, introducing the vaporized liquid hydrocarbon stream to the mixer, where the vaporized liquid hydrocarbon stream includes liquid hydrocarbons selected from the group consisting of liquid petroleum gas (LPG), methane, light naphtha, heavy naphtha, gasoline, kerosene, diesel, and combinations of the same. The method further includes the step of introducing the mixed feed to a dual catalytic zone. The dual catalytic zone includes a combustion zone includes a seven component catalyst, the seven component catalyst includes nickel in an amount between 0.5 wt % and 15 wt % by weight of the catalyst, rhodium in an amount between 0.1 wt % and 2 wt % by weight of the catalyst, rhenium in an amount between 0.1 wt % and 2 wt % by weight of the catalyst, platinum in an amount between 0.1 wt % and 2 wt % by weight of the catalyst, cerium oxide in an amount between 0.5 wt % and 10 wt % by weight of the catalyst, lanthanum oxide in an amount between 0.5 wt % and 5 wt % by weight of the catalyst, zirconium oxide in an amount between 0.5 wt % and 3 wt % by weight of the catalyst, a refractory support in an amount between 61 wt % and 97.7 wt %. The dual catalytic zone also includes a steam reforming zone downstream of the combustion zone, the steam reforming zone includes a steam reforming catalyst. The steam reforming catalyst includes nickel in an amount between 0.5 wt % and 15 wt % by weight of the catalyst, lanthanum oxide in an amount between 0.5 wt % and 5 wt % by weight of the catalyst, cerium oxide in an amount between 0.5 wt % and 10 wt % by weight of the catalyst, and an aluminate support in an amount between 70 wt % and 98.5 wt %. The process further includes the steps contacting the liquid hydrocarbon stream, steam, and oxygen-rich gas with the seven component catalyst to produce a combustion zone fluid; and contacting the combustion zone fluid with the steam reforming catalyst to produce the hydrogen-rich gas stream, where the hydrogen-rich gas stream includes hydrogen.

In certain embodiments, a temperature of the combustion zone of the dual catalytic zone is in the range between 700° C. and 850° C., wherein a temperature of the steam reforming zone is in the range between 700° C. and 850° C. In certain embodiments, a pressure of the combustion zone of the dual catalytic zone is atmospheric pressure, and wherein a pressure of the steam reforming zone is atmospheric pressure. In certain embodiments, the method further includes the step of vaporizing a liquid hydrocarbon stream at a temperature between 150° C. and 250° C. and atmospheric pressure to produce the vaporized liquid hydrocarbon stream. In certain embodiments, the gas hour space velocity of the dual catalytic zone is less than 45,000 hr−1. In certain embodiments, a hydrogen concentration in the hydrogen-rich gas stream is greater than 60 percent volume in volume. In certain embodiments, the hydrogen-rich gas stream includes additional product gases, where the additional product gases are selected from the group consisting of carbon monoxide, carbon dioxide, methane, nitrogen, and combinations of the same. In certain embodiments, the process is a continuous process. In certain embodiments, the hydrogen-rich gas stream is a fuel for a transportation vehicle.

In a second aspect, a system for producing a hydrogen-rich gas stream from a liquid hydrocarbon stream is provided. The dual catalytic zone is configured to contact the liquid hydrocarbon stream, steam, and an oxygen-rich gas to produce the hydrogen-rich gas stream.

In certain embodiments, the refractory support is selected from the group consisting of an aluminum oxide (alumina), a silicon oxide, and combinations of the same. In certain embodiments, the aluminate support is selected from the group alumina, magnesium aluminate, calcium aluminate, and combinations of the same. In certain embodiments, the steam reforming catalyst further includes platinum present in an amount between 0.1 wt % and 2 wt % by weight of the catalyst and where the aluminate support is present in an amount between 68 wt % and 98.4 wt % by weight of the catalyst.

BRIEF DESCRIPTION OF THE DRAWINGS

These and other features, aspects, and advantages of the scope will become better understood with regard to the following descriptions, claims, and accompanying drawings. It is to be noted, however, that the drawings illustrate only several embodiments and are therefore not to be considered limiting of the scope as it can admit to other equally effective embodiments.

DETAILED DESCRIPTION

Figure 1:
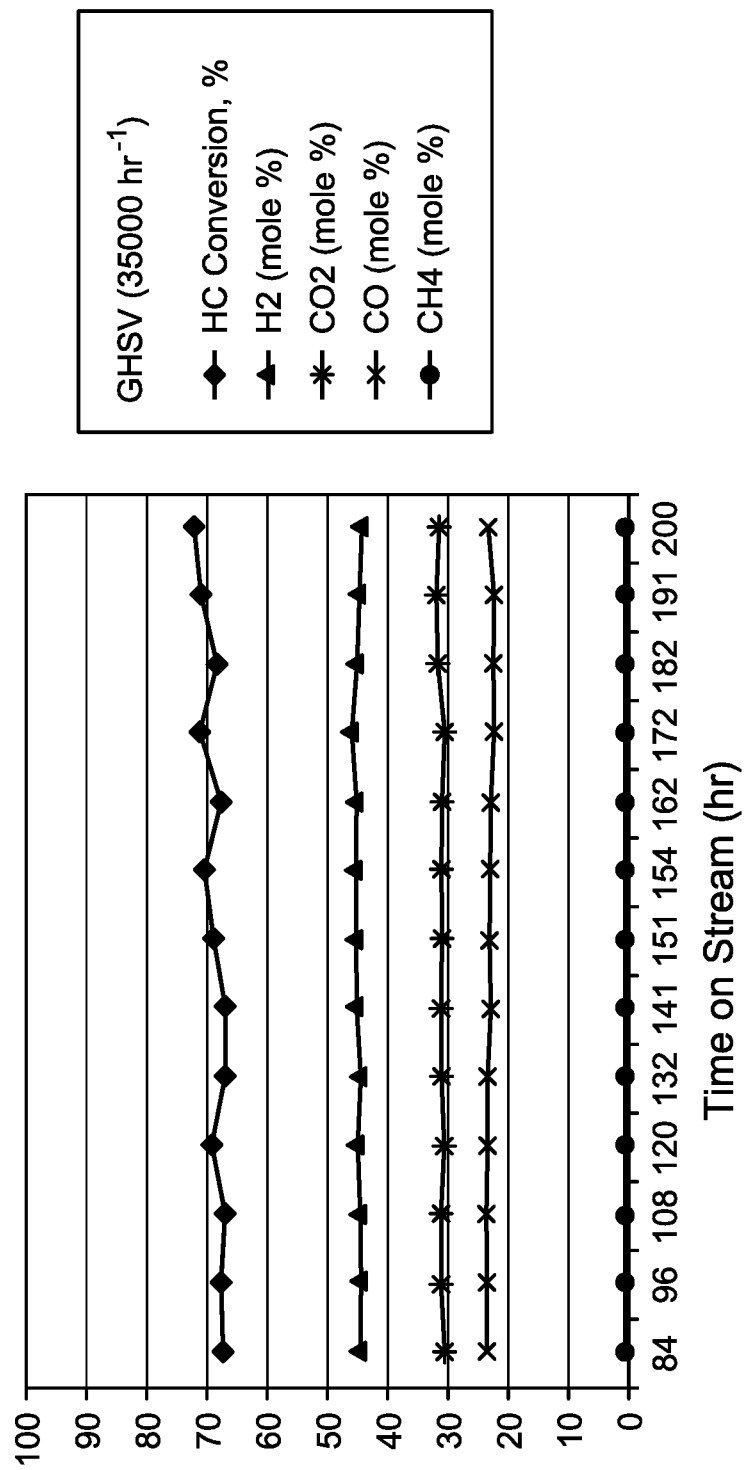
FIG. 1 provides the composition of the product gas stream from Example 1.

While the scope will be described with several embodiments, it is understood that one of ordinary skill in the relevant art will appreciate that many examples, variations and alterations to the apparatus and methods described here are within the scope. Accordingly, the embodiments described are set forth without any loss of generality, and without imposing limitations, on the embodiments. Those of skill in the art understand that the scope includes all possible combinations and uses of particular features described in the specification.

As used throughout, "in the absence" means the composition or method does not include, does not contain, is without.

As used throughout, "light hydrocarbons" refers to methane, propane, butane, naphtha, and combinations of the same.

As used throughout, "diesel" refers to a hydrocarbon stream containing carbons having a carbon number between 14 and 26 with a final point of 370° C. Diesel can contain about 43 wt % paraffins, about 42 wt % naphthenes, and about 15 wt % aromatics.

Advantageously, the dual catalytic zone of the instant claims expands the hydrocarbon streams that can be used to produce hydrogen. Conventional catalysts are limited to the use of light naphtha as a feed stream to produce hydrogen, whereas the dual catalytic zone allows hydrogen to be produced from diesel and other liquid hydrocarbon streams. Advantageously, the dual catalytic zone described here can process the aromatic content and presence of sulfur in the diesel without deactivation of the catalyst observed in conventional catalysts. Advantageously, the dual catalytic zone described here can promote the production of hydrogen while being resistant to deactivation by sulfur and coke deposition.

Described here are processes and systems for thermoneutral reforming (TNR) for producing a hydrogen-rich gas. The processes and systems described here can produce hydrogen rich-gases from liquid hydrocarbons, oxygen-rich gas, and steam in a dual catalytic zone. The dual catalytic zone can include two catalysts that can catalyze both combustion reactions and steam reforming reactions. The dual catalytic zone includes a combustion zone and a steam reforming zone in series, with the combustion zone upstream of the steam reforming zone. The combustion zone includes a seven component catalyst. The steam reforming zone includes a steam reforming catalyst. The combustion zone and steam reforming zone can be in separate catalyst beds and alternately can be in separate layers in the same catalyst bed. The combustion zone can contain between 10 vol % and 50 vol % of the total amount of catalyst in the dual catalytic zone. The steam reforming zone can contain between 50 vol % and 90 vol % of the total amount of catalyst in the dual catalytic zone.

The combustion reactions in the combustion zone are exothermic. The steam reforming reactions in the steam reforming zone are endothermic. By performing both reactions in the dual catalytic zone the thermal efficiency of the process is increased. The heat generated by the combustion reactions can be used to induce the endothermic steam reforming reactions, which can increase the reaction time in the steam reforming zone. In at least one embodiment, the dual catalytic zone can simultaneously catalyze exothermic combustion reactions and endothermic steam reforming reactions. Advantageously, the dual catalytic zone enables heat transfer between the combustion zone and the steam reforming zone without the need for an external heater.

The use of the dual catalytic zone can increase conversion of the liquid hydrocarbon stream, can increase hydrogen production, and an increase the concentration of hydrogen in the hydrogen-rich gas stream.

The seven component catalyst can catalyze combustion reactions and oxidation reactions with heavy hydrocarbons. The seven component catalyst is effective at catalyzing combustion reactions due to the active metal sites being well suited to catalyze the reactions. The steam reforming catalyst targets steam reforming reactions with light hydrocarbons. The steam reforming catalyst functions to in both reforming reactions and partial oxidation reactions, making it efficient as the steam reforming catalyst. One of skill in the art understands that while a catalyst may catalyze or target certain reactions for certain feed components, other reactions with other components can occur in the presence of the catalyst. Advantageously, the dual catalytic zone can increase the amount of hydrogen produced as compared to the use of the seven component catalyst or steam reforming catalyst working alone. The composition of each of the seven component catalyst and the steam reforming catalyst can be selected and designed so that the two catalysts work together to increase the production of hydrogen in the reactor unit. Advantageously, the compositions of each catalyst can be low in noble metal content.

The seven component catalyst can include nickel (Ni), rhodium (Rh), rhenium (Re), platinum (Pt), cerium oxide ($Ce_2O_3$), lanthanum oxide ($La_2O_3$), and zirconium oxide ($ZrO_2$). The seven component catalyst can include nickel in an amount between 0.5 weight percent (wt %) and 15 wt % by weight of the catalyst, rhodium in an amount between 0.1 wt % and 2 wt % by weight of the catalyst, rhenium in an amount between 0.1 wt % and 2 wt % by weight of the catalyst, platinum in an amount between 0.1 wt % and 2 wt % by weight of the catalyst, cerium oxide in an amount between 0.5 wt % and 10 wt % by weight of the catalyst, lanthanum oxide in an amount between 0.5 wt % and 5 wt % by weight of the catalyst, and zirconium oxide in an amount between 0.5 wt % and 3 wt % by weight of the catalyst. The seven component catalyst includes a refractory support. Examples of the refractory support include an aluminum oxide (alumina), a silicon oxide, and combinations of the same. The refractory support is present in an amount between 61 wt % and 97.7 wt % by weight of the catalyst. In at least one embodiment, the refractory support is aluminum oxide spheres. The aluminum oxide spheres can have a diameter of between about 2 millimeters (mm) and about 4 mm. The aluminum oxide spheres can have a surface area from about 25 square meters per gram ($m^2/g$) and about 125 $m^2/g$.

The seven component catalyst can be prepared by impregnation methods. The impregnation method can include a specific sequence of stages, where each stage can include the steps of impregnation, heat treatment and reduction in that order. In the first stage, aqueous solutions containing the soluble metal salts of rhodium and rhenium impregnate the refractory support. The rhodium/rhenium impregnated catalyst is then heat treated in an oxygen environment. First, the temperature is increased at a rate of about 0.5° C. per minute (/min) until about 120° C. is reached. Then the temperature is maintained at 120° C. for about one hour. The temperature is then raised to about 250° C. at a rate of about 0.5° C./min. The temperature is maintained at about 250° C. for about 1.5 hours. The heat treatment dries the rhodium/rhenium impregnated catalyst to produce a dried first stage catalyst in the absence of water. The oxygen environment can include air, oxygen, an oxygen-rich gas, or combinations of the same. In at least one embodiment, the heat treatment can include a first step of treating the rhodium/rhenium impregnated catalyst at about 60° C. for 10 to 30 minutes with an ammonia-rich gas before heat treatment in the oxygen environment. The dried first stage catalyst is then calcined in a hydrogen environment at temperature from about 400° C. to about 450° C. for about 2 hours to produce the first stage catalyst. The hydrogen environment can include hydrogen gas, hydrogen rich gas, or combinations of the same. After calcining, the first stage catalyst includes oxide or partially reduced forms of the metals. In the second stage, aqueous solutions containing the soluble metal salts of platinum and zirconium impregnate the first stage catalyst to produce a platinum/zirconium impregnated catalyst. The heat treatment steps and the calcining steps are repeated with the platinum/zirconium impregnated catalyst to produce a second stage catalyst. In the third stage, aqueous solutions of soluble metal salts of nickel, cerium, and lanthanum impregnate the second stage catalyst to produce a nickel/rare earth impregnated catalyst. The heat treatment steps and the calcining steps are repeated with the nickel/rare earth impregnated catalyst to produce the seven component catalyst. In at least one embodiment, the calcining step in the third stage can occur in a hydrogen environment at a temperature from about 400° C. to about 1100° C. for about 2 hours and alternately from about 700° C. to about 800° C. for about 2 hours. The oxides of the metals can be formed during the calcining steps.

The seven component catalyst can be reduced in situ in the dual catalytic zone under a reducing gas for about 4 hours. The reducing gas can include nitrogen and combinations of nitrogen and hydrogen. In at least one embodiment, the reducing gas contains nitrogen with 5 vol % hydrogen. The reducing step can occur in the dual catalytic zone prior to introducing a liquid hydrocarbon to the dual catalytic zone.

The steam reforming catalyst can include nickel (Ni), platinum (Pt), lanthanum oxide ($La_2O_3$), and cerium oxide ($Ce_2O_3$). In at least one embodiment, the steam reforming catalyst does not include platinum and only includes nickel, lanthanum oxide, and cerium oxide. The nickel can be elemental nickel, a reducible compound of nickel, and combinations of the same. The steam reforming catalyst can include nickel in an amount between 0.5 wt % and 15 wt % by weight of the catalyst, platinum in an amount between 0 wt % and 2 wt % by weight of the catalyst, lanthanum oxide in an amount between 0.5 wt % and 5 wt % by weight of the catalyst, and cerium oxide in an amount between 0.5 wt % and 10 wt % by weight of the catalyst. The steam reforming catalyst includes an aluminate support. Examples of the aluminate support include alumina, magnesium aluminate, calcium aluminate, and combinations of the same. The aluminate support is present in an amount between 70 wt % and 98.5 wt % by weight of the catalyst when the catalyst is in the absence of platinum. The aluminate support is present in an amount between 68 wt % and 98.4 wt % by weight of the catalyst when platinum is present. The aluminate support can include an alkaline metal. Examples of the alkaline metal can include potassium (K). The alkaline metal can be present in an amount between 0.5 wt % and 3.0 wt % by weight of the catalyst. The alkaline metal can be incorporated into the aluminate support to enhance the resistance to the buildup of coke on the catalyst. The inclusion of calcium aluminate, from refractory cement, for example, can increase the mechanical strength of the catalyst. The aluminate support can have any shape suitable for use in a catalyst support. Examples of shapes for the aluminate support include spheres, extrudates, rings with one or more holes, honeycombs, and combinations of the same. The extrudates can include simple extrudates, complex extrudates, and combinations of the same. Complex extrudates can include trilobe, quadralobe, and raschig rings. In at least one embodiment, the aluminate support includes spheres having diameters in the range from about 2 mm to about 3 mm. In at least one embodiment, the aluminate support includes simple extrudates having diameters in the range from about 1 mm to about 4 mm. In at least one embodiment, the aluminate support includes a raschig ring complex extrudate having an external diameter of about 10 mm, an internal diameter of about 4 mm, and a height of about 10 mm. The shape can be selected based on the application, the flow rate, and the rate of hydrogen production. In at least one embodiment, where the rate of hydrogen production is greater than 100,000 $Nm^3$/day the aluminate support can be in the shape of a ring with one or more holes. The aluminate support can be selected to have a surface area from between about 15 square meters per gram ($m^2$/g) and about 125 $m^2$/g and alternately from between about 50 $m^2$/g and about 125 $m^2$/g.

The steam reforming catalyst can have a high resistance to coke deposition due to the presence of lanthanum oxide and cerium oxide, which can provide in-situ oxygen to reduce or eliminate the formation of coke. Coke deposition can deactivate the catalyst, so a high resistance to coke deposition is advantageous to prolong the life of the catalyst before regeneration.

The steam reforming catalyst can be prepared by impregnation methods. The impregnation method can include a specific sequence of steps, specifically the steps of impregnation, heat treatment and calcination in that order. In a first step, aqueous solutions of metal salts containing the soluble metal salts of nickel, lanthanum, cerium, and optionally platinum, impregnate the aluminate support. The soluble metal salts can include nitrate salts. The composite material is then heat treated in an oxygen environment. First, the temperature is increased at a rate of between about 0.5° C. per minute (/min) and about 1.5° C./min until a temperature of about 120° C. is reached. Then the temperature is maintained at 120° C. for about one hour. The temperature is then raised to between about 250° C. and 350° C. at a rate of between about 0.5° C./min and about 1.5° C./min. The temperature is maintained at between about 250° C. and 350° C. for about 1.5 hours. The heat treatment dries the composite material to produce a dried composite in the absence of water. The oxygen environment can include air, oxygen, an oxygen-rich gas, or combinations of the same. In at least one embodiment, the heat treatment can include a first step of treating the composite material at about 60° C. for 10 to 30 minutes with an ammonia-rich gas before heat treatment in the oxygen environment. The dried composite is then calcined in an oxygen environment at a temperature from about 400° C. to about 600° C. for about 6 hours to produce the steam reforming catalyst. In at least one embodiment, the calcining step can be followed by a reduction step, where the steam reforming catalyst is reduced in a hydrogen environment at temperature from about 400° C. to about 1100° C. for about 2 hours and alternately from about 400° C. to about 500° C. for about 2 hours. The hydrogen environment can include hydrogen gas, hydrogen rich gas, or combinations of the same. The steps of impregnation, heat treatment, and calcination can be repeated until the steam reforming catalyst contains the desired composition of each of the components.

The calcining step in the method of preparing the seven component catalyst and the steam reforming catalyst can prepare the catalyst to withstand high temperatures during the thermo-neutral reaction of liquid hydrocarbons.

In the process for producing hydrogen-rich gas streams from liquid hydrocarbons, a liquid hydrocarbon stream is introduced to the dual catalytic zone. The liquid hydrocarbon stream can include methane, liquid petroleum gas (LPG), light naphtha, heavy naphtha, gasoline, kerosene, diesel, and combinations of the same. In at least one embodiment, the liquid hydrocarbon stream contains diesel. The liquid hydrocarbon stream can be vaporized at a temperature of between 150° C. and 250° C. to produce a vaporized hydrocarbon stream. The layout and dimensions of the dual catalytic zone can be designed for a gas hour space velocity (GHSV) of less than about 45,000 per hour ($hr^{-1}$). Advantageously, the use of the dual catalytic zone with such a GHSV results in reduced reactor size compared to the use of a single catalyst in a reactor. The reactor housing the dual catalytic zone can be 1/20 the size of a conventional steam reforming reactor and 1/10 the size of an auto-thermal reforming reactor. An oxygen-rich gas is introduced to the dual catalytic zone. The oxygen rich gas includes oxygen. The minimum ratio of oxygen to carbon is 0.2. Examples of the oxygen-rich gas include air, oxygen, oxygen enriched air, and combinations of the same. Steam is introduced to the dual catalytic zone. The steam includes water vapor. The steam temperature can be between 200° C. and 400° C. The steam pressure can be atmospheric pressure. The vaporized hydrocarbon stream can be mixed with the steam and the oxygen-rich gas in a mixer to produce a mixed feed. The mixer can be any type of unit capable of mixing two or more gases together. The mixed feed can be introduced to the dual catalytic zone.

In the dual catalytic zone, the liquid hydrocarbon stream, oxygen-rich gas, and steam are first contacted with the seven component catalyst of the combustion zone to produce a combustion zone fluid. The seven component catalyst can catalyze combustion reactions and oxidation reactions. The operating temperature in the combustion zone can be in the range between 700 and ° C. and 850° C. and alternately between 750° C. and 800° C. The operating pressure in the combustion zone is between atmospheric pressure and 10 bar. In at least one embodiment, the operating pressure is atmospheric pressure. The combustion zone fluid passes from the combustion zone to the steam reforming zone. The combustion zone fluid includes combustion reaction products, unreacted liquid hydrocarbons, oxygen, water vapor, and combinations of the same. The combustion zone fluid is contacted with the steam reforming catalyst of the steam reforming zone to produce a hydrogen-rich gas stream. The steam reforming catalyst can catalyze steam reforming reactions. The operating temperature in the steam reforming zone can be in the range between 700 and ° C. and 850° C. and alternately between 750° C. and 800° C. The operating pressure in the combustion zone is atmospheric pressure.

The operating conditions selected in the dual catalytic zone can be based on the composition of the liquid hydrocarbon stream, the desired hydrocarbon conversion, and the desired hydrogen concentration in the hydrogen-rich gas stream.

The hydrogen-rich gas stream can be in the gas phase. The hydrogen-rich gas stream can include hydrogen, carbon monoxide, carbon dioxide, methane, nitrogen and combinations of the same. In at least one embodiment, the hydrogen-rich gas stream can include hydrogen, carbon monoxide, and combinations of the same. The hydrogen concentration in hydrogen-rich gas stream can be greater than 60 percent volume in volume (% v/v). The methane concentration in hydrogen-rich gas stream can be less than 1% v/v. The concentration of carbon monoxide, carbon dioxide, and nitrogen can be less than 39% v/v.

The process for producing a hydrogen-rich gas stream can be a continuous process. In at least one embodiment, the temperature in the dual catalytic zone can be increased to operating temperatures using fuel combustion before the introduction of the mixed feed. The fuel combustion can cease after operating temperatures are reached. The dual catalytic zone can be in the absence of an external heater, such as a furnace, because the heat for the steam reforming reactions can be produced by the combustion reactions.

The hydrogen-rich gas stream can be further processed downstream of the dual catalytic zone. In at least one embodiment, the hydrogen-rich gas stream can be processed in a water-gas-shift reactor to produce a hydrogen-rich product. The hydrogen-rich product can be introduced to a separation unit to product a hydrogen gas stream. The separation unit can include a pressure swing absorption (PSA) unit and a membrane unit. The membrane unit can include one or more membranes capable of separating hydrogen from other gases. The hydrogen gas stream can contain 99.999% by volume hydrogen. The hydrogen gas stream can be suitable for use in fuel cells in transportation vehicles.

Advantageously, the dual catalytic zone can be sized for use in transportation vehicles. Transportation vehicles can include any mobile unit for transportation that includes an engine. Examples of transportation vehicles can include cars, trucks, buses, boats, drones, airplanes, or any other engine powered mobile unit. The dual catalytic zone can be integrated with fuel cells to produce power for stationary processes and for mobile processes. Advantageously, the compact nature of the dual catalytic zone can make it suitable for use in remote applications. Advantageously, the dual catalytic zone allows the use of liquid hydrocarbons without the need for prior desulfurization processes. Advantageously, the reduced amount of noble metals in the catalysts reduces the overall cost of the process to produce a hydrogen-rich gas.

The catalyst composition is in the absence of platinum. The methods for producing a methane-rich gas stream are in the absence of oxygen in the reactor feed. The heavy hydrocarbon stream is in the absence of diesel.

EXAMPLES

Example 1. Example 1 is a comparison example that describes preparation and use of a seven component catalyst for a single bed operation. The seven component catalyst was prepared by the incipient wetness impregnation method. The refractory support was alumina spheres of diameter in the range of about 2 to about 4 millimeters, with a surface area of about 85 $m^2/g$. In the first stage, 351 g of the alumina spheres were impregnated with 282.4 milliliters (ml) of aqueous solution containing 8.89 grams of rhodium (III) nitrate (CAS 10139-58-9—product code 83750, Sigma Aldrich® St. Louis, Mo.) and 1.56 grams of rhenium oxide VII (CAS 1314-68-7—product code 1314-68-7, Sigma Aldrich® St. Louis, Mo.). In the next step, the rhodium/rhenium impregnated catalyst was dried. The temperature was increased from ambient temperature to 60° C. at a rate of 0.5° C./min in static air. Then the temperature was increased from 60° C. to 120° C. at a rate of 1° C./min and then from 120° C. to 350° C. at a rate of 1.4° C./min in static air. The dried first stage catalyst was then reduced in flowing hydrogen at 430° C., cooled to between 30° C. and 60° C. and exposed to a flow of air to passivation the catalyst and to obtain the first stage catalyst. A small amount of the first stage catalyst was set aside for process control. In the second stage, 341 g of the first stage catalyst was impregnated with 274.63 ml of an aqueous solution containing 19.4 grams of zirconium oxynitrate hydrate (CAS 12985-18-3—product code 380679, Sigma Aldrich® St. Louis, Mo.) and 30.96 grams of tetraaminoplatinum (II) chloride solution (CAS 13933-33-0—product code 10836, Alfa Aesar® Tewksbury, Mass. containing 10% of Pt). The steps of drying, calcination and hydrogen reduction used in preparation of the first stage catalyst were repeated to obtain the second stage catalyst. A small amount of the second stage catalyst was set aside for process control. In the third stage, 345 g of the second stage catalyst was impregnated with 278 ml of an aqueous solution containing 10.25 grams of lanthanum nitrate hexahydrate (CAS 10277-43-7—product code 44346, Alfa Aesar® Tewksbury, Mass.), 30.61 grams of cerium (III) nitrate (CAS 10294-41-4—product code 392219, Sigma Aldrich® St. Louis, Mo.) and 117.15 grams of nickel nitrate hexahydrate (CAS 10277-43-7—code product 203874, Sigma Aldrich® St. Louis, Mo.). The nickel/rare earth impregnated catalyst was dried and then calcined. Then the reduction step occurred in flowing hydrogen at a temperature of 430° C., cooled to 30° C. and exposed to a flow of air to passivation to obtain the seven component catalyst. The seven component catalyst had a nominal composition of (% w/w): 0.2% Rh; 0.3% Re; 0.8% Pt; 1.0% $ZrO_2$; 1.0% $La_2O_3$, 6.0% Ni; 3.0% $Ce_2O_3$ supported on alumina. The preparation was repeated three times for a reproducibility check and the batch was then mixed manually obtaining about 1 kilogram (kg) of the seven component catalyst.

The seven component catalyst was loaded in a fixed catalyst bed in a micro reactor system. The system include a gas feed section and a liquid feed section, a preheating section, a reactor section and a product collection section. In the gas feed section, gases were fed through mass flow controllers. In the liquid feed section, liquid feeds were pumped by precision HPLC pumps. The reactor section was a reactor tube that was 17.5 mm in diameter and was made of Haynes 230 alloy. A three-zone electric furnace, whose temperatures were monitored and controlled by temperature controllers, heated the reactor system. Thermocouples were provided to measure the inner temperature of the reactor. The liquid hydrocarbon stream was diesel. The diesel had the properties in Table 1 as determined using simulated distillation of the DIST D-86 method.

TABLE 1

Properties of diesel used as liquid hydrocarbon stream

| Test | Results |
| --- | --- |
| DIST D-86, IBP ° F. | 350 |
| 5% Recovery ° F. | 441 |
| 10% Recovery ° F. | 471 |
| 20% Recovery ° F. | 509 |
| 30% Recovery ° F. | 545 |
| 40% Recovery ° F. | 578 |
| 50% Recovery ° F. | 614 |
| 60% Recovery ° F. | 652 |
| 70% Recovery ° F. | 690 |
| 80% Recovery ° F. | 725 |
| 90% Recovery ° F. | 766 |
| 95% Recovery ° F. | 794 |
| End Point ° F. | 846 |
| Total Recovery | 100 |
| Residue Vol. % | 0.0 |
| Loss Vol. % | 0.0 |
| Sulfur D-5453 (ppm) | 3 |

Figure 2:
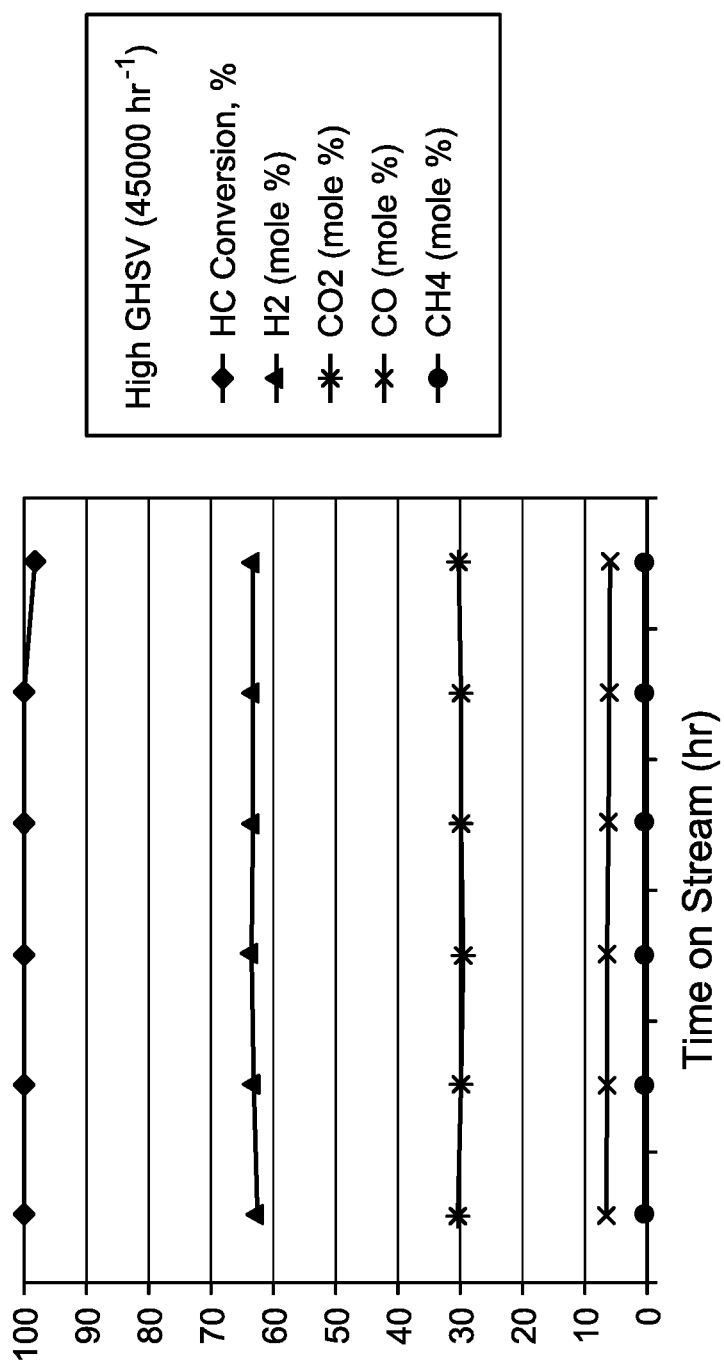
FIG. 2 provides the composition of the product gas stream from Example 2.

Six ml of the seven component catalyst was loaded and positioned at the center of the reactor tube, between layers of inert silicon carbide. The top portion of silicon carbide layer also served as a preheating zone. The feed mixture was heated up to 350° C. in the preheating zone. The reactor was heated up to the starting temperature of 410° C. under nitrogen flow of 20 liter per hour. Water was pumped into the pre-heater and vaporized, and steam was sent to a mixer. The diesel was vaporized in a pre-heater and introduced to the mixer. The flow rate of the steam and the vaporized diesel was maintained to have a steam to carbon molar ratio of 3.4 in the feed mixture. The diesel and steam were mixed with air in the mixer to have an oxygen to carbon (oxygen/carbon) ratio of 0.6 in the feed mixture. The feed mixture was pumped to the reactor at a total gas hour space velocity (GHSV) of about 35,000 hr−1. The reactor temperature increased about 800 and 820° C. in a few seconds without external heating. The product collection section consisted of a pressure control valve, a gas-liquid separator, a liquid level controller and a product tank. Gas samples were collected periodically throughout the continuous run. The gas samples were analyzed in two gas chromatographs, one equipped with TCD and the other with FID. The continuous process was conducted for more than 200 hours. FIG. 2 shows the results in graphical form. Table 2 shows the results in tabular form.

TABLE 2

Results of the continuous process of Example 1

| Run ID | 1 | 2 | 3 | 4 | 5 | 6 | 7 |
| --- | --- | --- | --- | --- | --- | --- | --- |
| Time on stream (hr) | 84.2 | 96.2 | 108.2 | 120.2 | 132.2 | 141.2 | 151.2 |
| GHSV ($h^{-1}$) | 35265 | 35431 | 35438 | 35613 | 35595 | 35465 | 35475 |
| Oxygen/carbon ratio | 0.6 | 0.61 | 0.61 | 0.61 | 0.61 | 0.61 | 0.61 |
| Steam/carbon ratio | 3.39 | 3.38 | 3.38 | 3.40 | 3.41 | 3.39 | 3.38 |

TABLE 2-continued

Results of the continuous process of Example 1

| | | | | | | | |
|---|---|---|---|---|---|---|---|
| Reaction Temp (° C.) | 800 | 800 | 810 | 810 | 800 | 800 | 800 |
| Mass balance, % | 101.3 | 100.4 | 99.9 | 101.0 | 101.1 | 100.3 | 100.1 |

Results

| | | | | | | | |
|---|---|---|---|---|---|---|---|
| Conversion, % | 67.7 | 68.0 | 67.3 | 69.6 | 67.3 | 67.2 | 69.3 |

Product Composition

| | | | | | | | |
|---|---|---|---|---|---|---|---|
| Hydrogen, L/h | 22.1 | 21.8 | 21.4 | 22.8 | 22.0 | 22.7 | 22.7 |
| Carbon monoxide | 11.7 | 11.5 | 11.4 | 11.9 | 11.7 | 11.6 | 11.6 |
| Carbon dioxide | 15.0 | 15.3 | 15.0 | 15.7 | 15.5 | 15.5 | 15.5 |
| Methane | 0.3 | 0.3 | 0.3 | 0.3 | 0.3 | 0.3 | 0.3 |
| Nitrogen | 101.4 | 101.1 | 100.2 | 102.3 | 102.2 | 100.5 | 100.4 |

Mole %, without Nitrogen

| | | | | | | | |
|---|---|---|---|---|---|---|---|
| Hydrogen | 44.9 | 44.5 | 44.5 | 44.9 | 44.5 | 45.3 | 45.3 |
| Carbon monoxide | 23.9 | 23.6 | 23.7 | 23.5 | 23.6 | 23.1 | 23.1 |
| Carbon dioxide | 30.6 | 31.3 | 31.1 | 30.9 | 31.2 | 30.9 | 30.9 |
| Methane | 0.7 | 0.7 | 0.7 | 0.7 | 0.6 | 0.7 | 0.7 |

Mole %, with Nitrogen

| | | | | | | | |
|---|---|---|---|---|---|---|---|
| Hydrogen | 14.7 | 14.5 | 14.4 | 14.9 | 14.5 | 15.1 | 15.1 |
| Carbon monoxide | 8.5 | 8.3 | 8.3 | 8.5 | 8.3 | 8.3 | 8.3 |
| Carbon dioxide | 10.0 | 10.2 | 10.1 | 10.2 | 10.2 | 10.3 | 10.3 |
| Methane | 0.2 | 0.2 | 0.2 | 0.2 | 0.2 | 0.2 | 0.2 |
| Nitrogen | 67.3 | 67.4 | 67.6 | 66.9 | 67.4 | 66.7 | 66.7 |

| Run ID | 8 | 9 | 10 | 11 | 12 | 13 |
|---|---|---|---|---|---|---|
| Time on stream (hr) | 153.5 | 161.6 | 171.6 | 182.2 | 191.1 | 200.1 |
| GHSV ($h^{-1}$) | 37821 | 35582 | 35569 | 35384 | 35099 | 35280 |
| Oxygen/carbon ratio | 0.60 | 0.61 | 0.61 | 0.61 | 0.61 | 0.61 |
| Steam/carbon ratio | 3.44 | 3.41 | 3.40 | 3.37 | 3.32 | 3.36 |
| Reaction Temp (° C.) | 800 | 800 | 815 | 810 | 815 | 815 |
| Mass balance, % | 103.0 | 101.7 | 101.7 | 101.4 | 101.5 | 102.6 |

Results

| | | | | | | |
|---|---|---|---|---|---|---|
| Conversion, % | 70.9 | 68.0 | 71.4 | 68.6 | 71.2 | 72.5 |

Product Composition

| | | | | | | |
|---|---|---|---|---|---|---|
| Hydrogen, L/h | 25.3 | 23.2 | 24.2 | 22.3 | 23.2 | 22.7 |
| Carbon monoxide | 12.9 | 11.8 | 11.8 | 11.0 | 11.7 | 12.0 |
| Carbon dioxide | 17.3 | 15.9 | 16.1 | 15.6 | 16.6 | 16.2 |
| Methane | 0.4 | 0.3 | 0.4 | 0.3 | 0.4 | 0.4 |
| Nitrogen | 111.8 | 102.8 | 101.9 | 103.9 | 101.9 | 105.1 |

Mole %, without Nitrogen

| | | | | | | |
|---|---|---|---|---|---|---|
| Hydrogen | 45.3 | 45.2 | 46.1 | 45.3 | 44.8 | 44.3 |
| Carbon monoxide | 23.1 | 23.0 | 22.5 | 22.3 | 22.5 | 23.4 |
| Carbon dioxide | 30.9 | 31.1 | 30.7 | 31.8 | 31.9 | 31.6 |
| Methane | 0.7 | 0.7 | 0.7 | 0.7 | 0.8 | 0.8 |

Mole %, with Nitrogen

| | | | | | | |
|---|---|---|---|---|---|---|
| Hydrogen | 15.1 | 15.1 | 15.7 | 14.5 | 15.1 | 14.5 |
| Carbon monoxide | 8.3 | 8.3 | 8.3 | 7.7 | 8.2 | 8.3 |
| Carbon dioxide | 10.3 | 10.3 | 10.4 | 10.2 | 10.8 | 10.4 |
| Methane | 0.2 | 0.2 | 0.2 | 0.2 | 0.3 | 0.3 |
| Nitrogen | 66.7 | 66.7 | 66.0 | 67.9 | 66.3 | 67.2 |

A small amount of coke fine powder was observed in the spent catalyst after the test run.

Example 2. Example is a comparison example of a two bed system. A first bed of the seven component catalyst prepared according to Example 1 was followed by a second bed of a commercial steam reforming catalyst containing a mixture of nickel/nickel oxide, magnesium oxide, alumina and magnesium aluminate. The first bed contained 10% v/v and the second bed contained 90% v/v of the total catalyst used in the two bed system.

Figure 3:
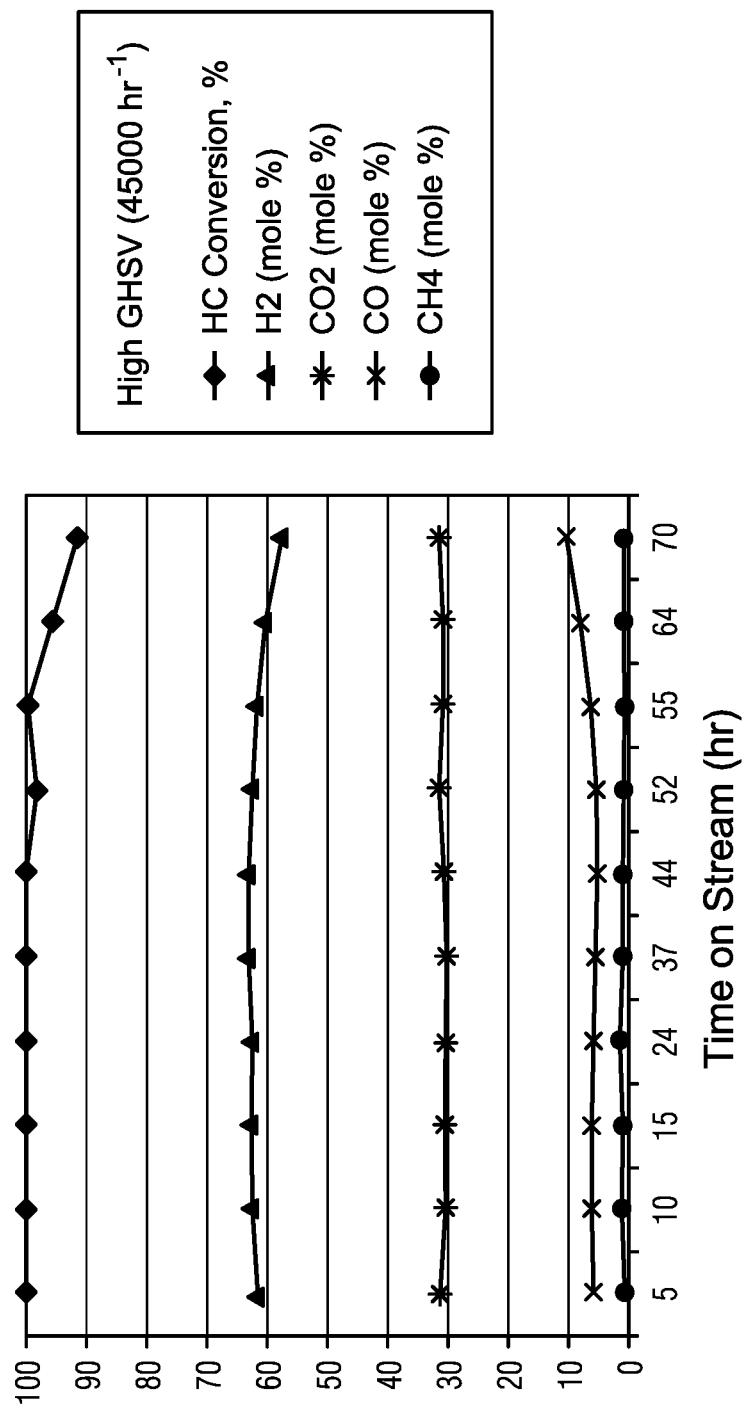
FIG. 3 provides the composition of the hydrogen-rich gas stream from Example 3.

The same feed mixture and reactor conditions were the same as used in Example 1. However, the flow rate of the feed mixture was about 45,000 GHSV $h^{-1}$. Gas samples were collected periodically throughout the continuous run. The gas samples were analyzed in two gas chromatographs, one equipped with TCD and the other with FID. The continuous process was conducted for more than 60 hours. At this time, carbon was formed blocking the reactor and causing a pressure buildup. FIG. 3 shows the results in graphical form. Table 3 shows the results in tabular form.

TABLE 3

Results of the continuous process of Example 2

| Run ID | 1 | 2 | 3 | 4 | 5 | 6 |
|---|---|---|---|---|---|---|
| Time on stream (hr) | 15.6 | 21.6 | 31.6 | 47.0 | 56.0 | 70.2 |
| GHSV ($h^{-1}$) | 46377 | 44142 | 44636 | 44675 | 44609 | 44741 |
| Oxygen/carbon ratio | 0.65 | 0.60 | 0.60 | 0.60 | 0.60 | 0.60 |
| Steam/carbon ratio | 3.52 | 3.59 | 3.50 | 3.53 | 3.53 | 3.52 |
| Reaction Temp (° C.) | 790 | 780 | 770 | 770 | 770 | 770 |
| Mass balance, % | 103.0 | 106.6 | 101.9 | 103.0 | 104.6 | 102.4 |
| Results | | | | | | |
| Conversion, % | 100.0 | 100.0 | 100.0 | 100.0 | 100.0 | 98.3 |
| $H_2/(CO + CO_2)$ | 1.7 | 1.7 | 1.8 | 1.8 | 1.8 | 1.7 |
| Product Composition | | | | | | |
| Hydrogen, L/h | 91.1 | 91.9 | 93.5 | 94.3 | 96.3 | 89.6 |
| Carbon monoxide | 9.6 | 9.3 | 9.4 | 9.3 | 9.6 | 8.4 |
| Carbon dioxide | 44.6 | 43.7 | 43.4 | 44.2 | 45.3 | 42.8 |
| Methane | 0.5 | 0.6 | 0.8 | 0.8 | 0.9 | 0.7 |
| Nitrogen | 135.3 | 128.8 | 121.9 | 123.2 | 125.6 | 121.8 |
| Mole %, without Nitrogen | | | | | | |
| Hydrogen | 62.5 | 63.1 | 63.6 | 63.5 | 63.3 | 63.3 |
| Carbon monoxide | 6.6 | 6.4 | 6.4 | 6.2 | 6.3 | 6.0 |
| Carbon dioxide | 30.6 | 30.0 | 29.5 | 29.7 | 29.8 | 30.2 |
| Methane | 0.4 | 0.4 | 0.6 | 0.6 | 0.6 | 0.5 |
| Mole %, with Nitrogen | | | | | | |
| Hydrogen | 32.4 | 33.5 | 34.8 | 34.7 | 34.7 | 34.0 |
| Carbon monoxide | 3.5 | 3.5 | 3.6 | 3.5 | 3.6 | 3.3 |
| Carbon dioxide | 15.9 | 15.9 | 16.1 | 16.3 | 16.3 | 16.2 |
| Methane | 0.2 | 0.2 | 0.3 | 0.3 | 0.3 | 0.3 |
| Nitrogen | 48.1 | 46.9 | 45.3 | 45.3 | 45.2 | 46.3 |

The results in Table 3 indicate that the two beds produce a considerable increase in the conversion of the feed mixture, the concentration of hydrogen in the gas phase product, and the production of hydrogen. These factors result in a reduction of the process costs. However, the buildup of coke indicates that the commercial steam reforming catalyst was ineffective due to coke deactivation.

Example 3. Example 3 is an example of the process of a dual catalytic zone. The combustion zone contained the seven component catalyst prepared according to Example 1. The steam reforming zone contained a steam reforming catalyst. The steam reforming catalyst was prepared as follows.

The aluminate support was magnesium aluminate promoted with potassium. The aluminate support was prepared by impregnating 300 grams of commercial hydrotalcite (SudChemie® New Delhi, India, product code T-2701 1/16 inch, with 30% w/w of MgO in alumina balance) with 270 ml of an aqueous solution containing 1114 g of potassium hydroxide. The impregnated material was dried overnight at 100° C. and then calcined at 1050° C. in air for 4 hours. The aluminate support had a surface area 82.5 $m^2/g$ and a pore volume of 0.70 $cm^3/g$.

The steam reforming catalyst was prepared by placing 130 grams of the aluminate support in contact for 1 min with 104.7 ml of an aqueous solution containing 0.52 g of tetraaminoplatino chloride (II) monohydrate (CAS 13933-33-0—product code 10836, Alfa Aesar® Tewksbury, Mass.), 3.84 grams of lanthanum nitrate hexahydrate (CAS 10277-43-7—product code 44346, Alfa Aesar® Tewksbury, Mass.), 11.47 grams of cerium (III) nitrate (CAS 10294-41-4—product code 392219, Sigma Aldrich® St. Louis, Mo.) and 42.97 grams of nickel nitrate hexahydrate (CAS 10277-43-7—code product 203874, Sigma Aldrich® St. Louis, Mo.) to produce a composite material. The composite material was dried from ambient temperature to 120° C. at a rate of 1° C./min and then the temperature was increased from 120° C. to 350° C. at a rate of 1.4° C./min to produce a dried composite material for about 10 hours. The dried composite material was calcined at 600° C. for 6 hours to produce a calcined composite material. The calcined composite material was then reduced in flowing hydrogen gas at 430° C., cooled to 30° C. for about 6 hours and exposed to a flow of air to passivate the steam reforming catalyst. The resulting steam reforming catalyst was a Pt-Ni-$Ce_2O_3$-$La_2O_3$/K-magnesium aluminate catalyst. The steam reforming catalyst had a nominal composition of (% wt/wt): 0.2% Pt, 6% Ni, 1.0 $La_2O_3$, 3% $Ce_2O_3$, 2.7% $K_2O$, supported in magnesium aluminate.

The catalyst bed in the combustion zone contained 10% v/v and the catalyst bed in the steam reforming zone contained 90% v/v of the total catalyst used in the dual catalytic zone. The liquid hydrocarbon stream was about 45,000 GHSV. The reactor conditions were the same as used in Example 1. Gas samples were collected periodically throughout the continuous run. The gas samples were analyzed in two gas chromatographs, one equipped with TCD and the other with FID. The continuous process was conducted for more than 70 hours. FIG. 3 shows the results in graphical form. Table 4 shows the results in tabular form.

TABLE 4

Results of the continuous process of Example 3

| Run ID | 1 | 2 | 3 | 4 | 5 | 6 |
|---|---|---|---|---|---|---|
| Time on stream (hr) | 5.0 | 10.2 | 15.2 | 23.5 | 37.4 | 44.0 |
| GHSV ($hr^{-1}$) | 46326 | 44935 | 44993 | 44946 | 44911 | 44834 |
| Run time (hr) | 5.0 | 5.2 | 5.0 | 8.3 | 13.9 | 6.5 |
| Oxygen/carbon ratio | 0.65 | 0.61 | 0.61 | 0.61 | 0.62 | 0.61 |
| Steam/carbon ratio | 3.51 | 3.52 | 3.52 | 3.52 | 3.56 | 3.52 |
| Reaction Temp (° C.) | 800 | 770 | 760 | 760 | 780 | 780 |
| Mass balance, % | 103.8 | 103.5 | 104.1 | 106.1 | 102.8 | 102.6 |
| Results | | | | | | |
| Conversion, % | 100.0 | 100.0 | 100.0 | 100.0 | 100.0 | 100.0 |
| $H_2/(CO + CO_2)$ | 1.7 | 1.7 | 1.7 | 1.7 | 1.7 | 1.7 |
| Product Composition | | | | | | |
| Hydrogen, L/h | 89.9 | 91.6 | 92.3 | 93.8 | 92.1 | 90.1 |
| Carbon monoxide | 8.7 | 9.0 | 8.7 | 8.8 | 8.4 | 7.5 |
| Carbon dioxide | 45.3 | 44.6 | 45.0 | 45.4 | 44.3 | 44.0 |
| Methane | 1.3 | 1.7 | 1.7 | 2.4 | 1.6 | 1.4 |
| Nitrogen | 136.2 | 127.0 | 127.1 | 132.2 | 126.9 | 126.3 |
| Mole %, without Nitrogen | | | | | | |
| Hydrogen | 62.0 | 62.4 | 62.5 | 62.4 | 62.9 | 63.0 |
| Carbon monoxide | 6.0 | 6.1 | 5.9 | 5.8 | 5.7 | 5.2 |
| Carbon dioxide | 31.2 | 30.3 | 30.5 | 30.2 | 30.3 | 30.8 |
| Methane | 0.9 | 1.2 | 1.1 | 1.6 | 1.1 | 1.0 |
| Mole %, with Nitrogen | | | | | | |
| Hydrogen | 32.0 | 33.4 | 33.6 | 33.2 | 33.7 | 33.5 |
| Carbon monoxide | 3.2 | 3.4 | 3.3 | 3.2 | 3.2 | 2.9 |
| Carbon dioxide | 16.1 | 16.3 | 16.4 | 16.1 | 16.2 | 16.3 |
| Methane | 0.4 | 0.6 | 0.6 | 0.8 | 0.6 | 0.5 |
| Nitrogen | 48.4 | 46.4 | 46.2 | 46.8 | 46.4 | 46.9 |

| Run ID | 7 | 8 | 9 | 10 |
|---|---|---|---|---|
| Time on stream (hr) | 52.4 | 54.8 | 63.9 | 70.1 |
| GHSV ($hr^{-1}$) | 44931 | 44696 | 44995 | 44962 |
| Run time (hr) | 8.5 | 2.4 | 9.1 | 6.2 |
| Oxygen/carbon ratio | 0.60 | 0.60 | 0.60 | 0.60 |
| Steam/carbon ratio | 3.5 | 3.5 | 3.5 | 3.5 |
| Reaction Temp (° C.) | 780 | 780 | 760 | 765 |
| Mass balance, % | 102.8 | 96.8 | 102.5 | 100.6 |
| Results | | | | |
| Conversion, % | 98.1 | 99.7 | 95.4 | 91.2 |
| $H_2/(CO + CO_2)$ | 1.7 | 1.6 | 1.5 | 1.4 |
| Product Composition | | | | |
| Hydrogen, L/h | 85.1 | 75.3 | 72.2 | 58.1 |
| Carbon monoxide | 7.2 | 7.8 | 9.5 | 10.1 |
| Carbon dioxide | 43.1 | 37.9 | 37.2 | 31.3 |
| Methane | 1.1 | 1.0 | 0.9 | 0.8 |
| Nitrogen | 126.1 | 122.4 | 128.5 | 125.2 |
| Mole %, without Nitrogen | | | | |
| Hydrogen | 62.4 | 61.7 | 60.3 | 57.9 |
| Carbon monoxide | 5.2 | 6.4 | 7.9 | 10.1 |
| Carbon dioxide | 31.6 | 31.1 | 31.1 | 31.2 |
| Methane | 0.8 | 0.8 | 0.7 | 0.8 |
| Mole %, with Nitrogen | | | | |
| Hydrogen | 32.4 | 30.8 | 29.1 | 25.8 |
| Carbon monoxide | 2.8 | 3.3 | 4.0 | 4.7 |
| Carbon dioxide | 16.4 | 15.5 | 15.0 | 13.9 |
| Methane | 0.4 | 0.4 | 0.3 | 0.3 |
| Nitrogen | 48.0 | 50.1 | 51.8 | 55.5 |

The results in Table 3 indicate that the dual catalytic zone produces a considerable increase in the conversion of the liquid hydrocarbon stream, the concentration of hydrogen in the hydrogen-rich gas stream, and the production of hydrogen. Unlike the two bed system of Example 2, the dual catalytic zone ran for more than 60 hours and no coke formation was observed. The results suggest that the steam reforming catalyst is effective to suppress coke formation.

TABLE 5

Comparison of Examples 1-3

| Example | # of Beds | Catalyst | GHSV (hr$^{-1}$) | Liquid Hydrocarbon Conversion | H$_2$ in Product Stream (mol %) | Carbon in the reactor |
|---|---|---|---|---|---|---|
| 1 | 1 | Seven Component Catalyst | 35,000-36,000 | 67%-73% | 44%-45% | Yes, a small amount |
| 2 | 2 | Bed 1: Seven Component Catalyst Bed 2: Commercial Ni-supported catalyst | 44,000-46,000 | 98%-100% | 62%-64% | Yes, after 70 hours on stream |
| 3 | 2 | Bed 1: Seven Component Catalyst Bed 2: Steam Reforming Catalyst | 44,000-46,000 | 92%-100% | 58%-63% | No, after 70 hours on stream |

Table 5 tabulates the results of Examples 1-3 for comparison.

Although the embodiments here have been described in detail, it should be understood that various changes, substitutions, and alterations can be made hereupon without departing from the principle and scope of the embodiments. Accordingly, the scope should be determined by the following claims and their appropriate legal equivalents.

There various elements described can be used in combination with all other elements described here unless otherwise indicated.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed here as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the embodiments pertain, except when these references contradict the statements made here.

As used here and in the appended claims, the words "comprise," "has," and "include" and all grammatical variations of the same are each intended to have an open, non-limiting meaning that does not exclude additional elements or steps.

As used here, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present embodiments.

That which is claimed is:

1. A process for producing a hydrogen-rich gas stream from a vaporized liquid hydrocarbon stream, the process comprising the steps of:

introducing steam to a mixer, wherein the steam is a temperature between 200° C. and 400° C. and atmospheric pressure;

introducing an oxygen-rich gas to the mixer, wherein the oxygen-rich gas is selected from the group consisting of air, oxygen, oxygen enriched air, and combinations of the same introducing a vaporized liquid hydrocarbon stream to the mixer, wherein the vaporized liquid hydrocarbon stream comprises liquid hydrocarbons selected from the group consisting of liquid petroleum gas (LPG), light naphtha, heavy naphtha, gasoline, kerosene, diesel, and combinations of the same;

mixing the steam, oxygen-rich gas, and vaporized liquid hydrocarbon stream to produce a mixed feed;

introducing the mixed feed to a dual catalytic zone, wherein the dual catalytic zone comprises:

a combustion zone comprising a seven component catalyst, the seven component catalyst consisting of:

nickel in an amount between 0.5 wt % and 15 wt % by weight of the catalyst, rhodium in an amount between 0.1 wt % and 2 wt % by weight of the catalyst, rhenium in an amount between 0.1 wt % and 2 wt % by weight of the catalyst, platinum in an amount between 0.1 wt % and 2 wt % by weight of the catalyst, cerium oxide in an amount between 0.5 wt % and 10 wt % by weight of the catalyst, lanthanum oxide in an amount between 0.5 wt % and 5 wt % by weight of the catalyst, zirconium oxide in an amount between 0.5 wt % and 3 wt % by weight of the catalyst, a refractory support in an amount between 61 wt % and 97.7 wt %, and a steam reforming zone downstream of the combustion zone, the steam reforming zone comprising a steam reforming catalyst, the steam reforming catalyst consisting of:

nickel in an amount between 0.5 wt % and 15 wt % by weight of the catalyst, lanthanum oxide in an amount between 0.5 wt % and 5 wt % by weight of the catalyst, cerium oxide in an amount between 0.5 wt % and 10 wt % by weight of the catalyst, and an aluminate support in an amount between 70 wt % and 98.5 wt %;

contacting the mixed feed comprising the vaporized liquid hydrocarbon stream, steam, and oxygen-rich gas with the seven component catalyst to produce a combustion zone fluid; and contacting the combustion zone fluid with the steam reforming catalyst to produce the hydrogen-rich gas stream, wherein the hydrogen-rich gas stream comprises hydrogen.

2. The process of claim 1, wherein a temperature of the combustion zone of the dual catalytic zone is in the range between 700° C. and 850° C., wherein a temperature of the steam reforming zone is in the range between 700° C. and 850° C.

3. The process of claim 1, wherein a pressure of the combustion zone of the dual catalytic zone is atmospheric pressure, and wherein a pressure of the steam reforming zone is atmospheric pressure.

4. The process of claim 1, further comprising the step of vaporizing a liquid hydrocarbon stream at a temperature between 150° C. and 250° C. and atmospheric pressure to produce the vaporized liquid hydrocarbon stream.

5. The process of claim 1, wherein the gas hour space velocity of the dual catalytic zone is less than 45,000 hr-1.

6. The process of claim 1, wherein a hydrogen concentration in the hydrogen-rich gas stream is greater than 60 percent volume in volume.

7. The process of claim 1, wherein the hydrogen-rich gas stream comprises additional product gases, wherein the additional product gases are selected from the group consisting of carbon monoxide, carbon dioxide, methane, nitrogen, and combinations of the same.

8. The process of claim 1, wherein the process is a continuous process.

9. The process of claim 1, wherein the hydrogen-rich gas stream is a fuel for a transportation vehicle.

10. The process of claim 1, wherein the steam reforming catalyst further comprises platinum present in an amount between 0.1 wt % and 2 wt % by weight of the catalyst and wherein the aluminate support is present in an amount between 68 wt % and 98.4 wt % by weight of the catalyst.

* * * * *